United States Patent [19]

Maeda et al.

[11] Patent Number: 4,733,619
[45] Date of Patent: Mar. 29, 1988

[54] POWDER FEEDER

[75] Inventors: Sadahiko Maeda; Yasumasa Idei, both of Ube; Toshihiro Inatani, Chiba; Mitsuo Sumito, Chiba; Takao Hamada, Chiba; Shunji Hamada, Chiba, all of Japan

[73] Assignee: Ube Industries, Hyogo, Japan

[21] Appl. No.: 936,208

[22] Filed: Dec. 1, 1986

[51] Int. Cl.$^4$ .............................................. F23G 5/12
[52] U.S. Cl. .................................... 110/229; 110/245; 406/108; 406/127; 406/142; 406/146
[58] Field of Search ............... 110/245, 229; 122/4 D; 406/141, 142, 146, 108, 122, 127, 138; 141/67

[56] References Cited

U.S. PATENT DOCUMENTS 2,786,800 3/1957 Myers ............................ 406/142 X
4,203,689 5/1980 Kraxmer et al. ............... 406/138 X
4,498,818 2/1985 Bjarnason et al. ............. 406/127 X

FOREIGN PATENT DOCUMENTS 928829 6/1963 United Kingdom ............... 406/141
1,300,935 12/1972 United Kingdom ............... 406/108

Primary Examiner—Edward G. Favors
Attorney, Agent, or Firm—Townsend & Townsend

[57] ABSTRACT

A powder feeder, includes a cylinder body connected to a gas blow pipe for fluidizing a powder at its bottom portion; a porous plate crossing the lower portion of the cylinder body above a gas blow hole; a partition plate which divides the interior of the cylinder body into a powder supply side and a delivery side and has a slit for communicating the supply and delivery sides with each other at its upper portion; a powder supply pipe connected to the lower portion of the cylinder body at the supply side to be inclined downward toward a connecting portion; and a powder delivery pipe connected to the lower portion of the cylinder body at the delivery side to be inclined downward in a delivery direction.

8 Claims, 8 Drawing Figures

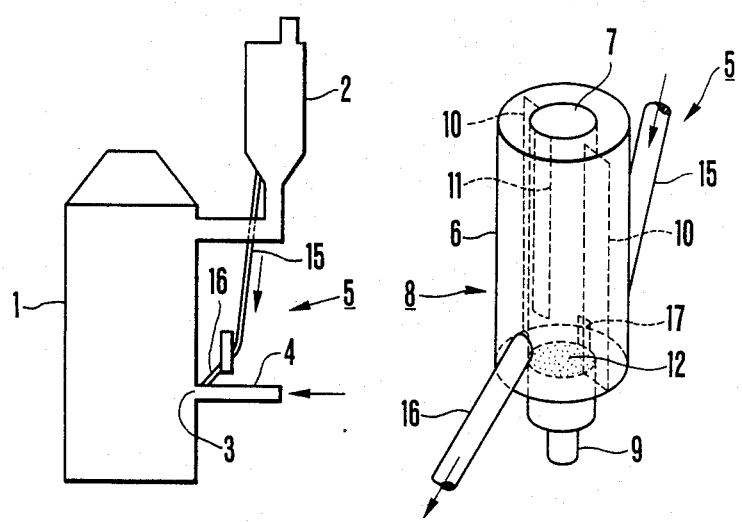
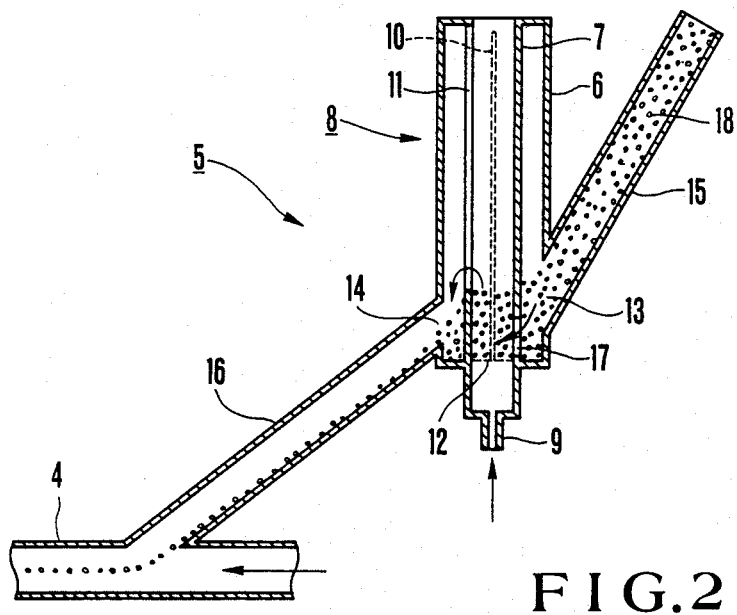
FIG.1  FIG.3
FIG.2

POWDER FEEDER

BACKGROUND OF THE INVENTION

The present invention relates to a powder feeder in an apparatus for feeding a powder by means of an air or a gas.

When a powder ore containing, e.g., a metal oxide, is pre-reduced and is then reduced at molten state to manufacture a molten metal, a powder feeder for feeding powder ore by an air or a gas is required in a powder ore feeder from a pre-reduction furnace to a smelting reduction furnace, a dust delivery unit of an exhaust gas combustor in a rotary kiln process for reduced iron production, or a sand recovery feeder in a molding sand roasting furnace.

However, a powder feeder used in such a location, particular, a feeder arranged on a powder ore feeder, cannot be a mechanical powder feeder, e.g., a rotary feeder since an object to be fed is at high temperatures around 1,000° C. Therefore, demand has arisen for a feeder capable of feeding a high-temperature powder.

SUMMARY OF THE INVENTION

It is a principal object of the present invention to provide a powder feeder which can reliably and easily feed a powder in a constant amount even at a very high temperature.

It is another object of the present invention to provide a powder feeder which can adjust an amount of powder to be fed by a simple operation.

It is still another object of the present invention to provide a powder feeder which does not require a mechanical flow-rate adjusting mechanism.

In order to achieve the above object, there is provided a powder feeder, comprising: a cylinder body connected to a gas blow pipe for fluidizing a powder at its bottom portion; a porous plate crossing the lower portion of the cylinder body above a gas blow hole; partitioning means which divides the interior of the cylinder body into a powder supply side and a delivery side and communicates the supply and delivery sides with each other at its upper portion; a powder supply pipe connected to the lower portion of the cylinder body at the supply side to be inclined downward toward a connecting portion; and a powder delivery pipe connected to the lower portion of the cylinder body at the delivery side to be inclined downward in a delivery direction.

BRIEF DESCRIPTION OF THE DRAWINGS

FIG. 1 is a schematic view showing an entire smelting reduction apparatus to which a powder feeder according to an embodiment of the present invention is applied;

FIG. 2 is a cross-sectional view of a powder feeder;

FIG. 3 is a perspective view of the powder feeder shown in FIG. 2;

FIGS. 5 and 6 show another embodiment of the present invention, in which FIG. 5 is a cross-sectional view of a powder feeder corresponding with FIG. 2, and FIG. 6 is a perspective view thereof corresponding with FIG. 3;

DESCRIPTION OF THE PREFERRED EMBODIMENT

Figure 4:
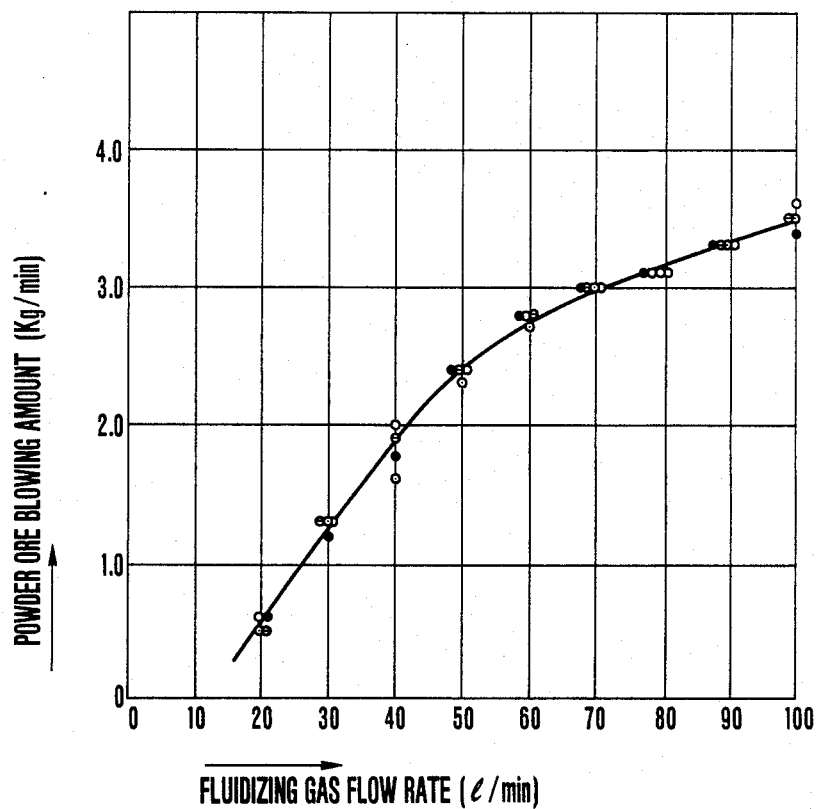
FIG. 4 is a graph showing the relationship between an $N_2$ gas flow rate and a powder ore feed amount.

An embodiment of the present invention will now be described with reference to FIGS. 1 to 4.

In this embodiment, a powder feeder according to the present invention is applied to a smelting reduction apparatus. Referring to FIG. 1, a pre-reduction furnace 2 is coupled to an upper portion of smelting reduction furnace 1, so that a high-temperature reducing gas is introduced from the furnace 1 to the furnace 2. A tuyère 3 formed in the lower portion of the reducing furnace 1 is connected to a blow pipe 4 for blowing a high-temperature air. A powder feeder 5 (to be described later in detail) is arranged between the pre-reduction furnace 2 and the blow pipe 4.

The powder feeder 5 comprises a cylinder body 9 consisting of an outer cylinder 6 and an inner cylinder 7 concentrical therewith. The upper and lower ends of the outer cylinder 6 are closed at the periphery of the inner cylinder 7. The inner cylinder 7 extends downward from the outer cylinder 6, and the bottom plate of this extending portion is connected to a gas blow pipe 9 for supplying $N_2$ gas for fluidizing a powder. Reference numeral 10 denotes partition plates for partitioning the cylinder body 8 into a supply side and a delivery side. The partition plates 10 divide a cylindrical space between the outer and inner cylinders 6 and 7 into two sections and extend along almost the total length of the cylinder body 8 to leave an appropriate gap between themselves and the upper end of the outer cylinder 6. A slit 11 for communicating the supply and delivery sides with each other is formed in the outer wall of the inner cylinder 7 at the delivery side. A porous plate 12 having a large number of small holes is arranged on the lower portion of the inner cylinder 7 at substantially the same level as the bottom plate of the outer cylinder 6 to cross the inner cylinder 7. A supply port 13 and a delivery port 14 are respectively open to lower portions of an outer wall at the supply and delivery sides of the outer cylinder 6 of the cylinder body 8 above the porous plate 12. The supply port 13 is connected to the bottom portion of the pre-reduction furnace 2 through a supply pipe 15 for powder ore. The supply pipe 15 is inclined through an angle of rest or more, so that the supply port 13 side is lower. The delivery port 14 and the blow pipe 4 are coupled through a powder ore delivery pipe 16. The delivery pipe 16 is inclined through an angle of rest or more, so that the blow pipe 4 side is lower. An opening 17 for communicating the outer and inner cylinders 6 and 7 with each other is formed in the lower portion of the inner cylinder 7. The slit 11 extends up to the upper end of the inner cylinder 7 to have its lower end slightly higher than the upper end of the delivery port 14.

The operation of this embodiment with the above arrangement will be described hereinafter.

Powder ore 18, e.g., chromium powder ore, in the pre-reduction furnace 2 forms a moving bed by its weight, and moves downward in the supply pipe 15.

In a normal state, a pressure in the smelting reduction furnace 1 is higher than that in the pre-reduction furnace 2 by 0.2 to 0.4 kg/cm$^2$, and a gas flows upward in the moving bed. The powder ore 18 moving downward in the supply pipe 15 enters the cylinder body 8 from the supply port 13, and is flowed in the lower portion between the supply side of the outer cylinder 6 and the inside of the inner cylinder 8 communicating with each other through the opening 17. At this time, since the N$_2$ gas is supplied from the gas blow pipe 9, it is blown into the inner cylinder 7 through the small holes of the porous plate 12, thus fluidizing the powder ore above the porous plate 12. In a fluidized state at minimum fluidized gas flow rate, the upper surface of the fluidized bed of the powder ore 18 coincides with the upper end of the opening 17. However, when the N$_2$ gas flow rate is increased, the height of the fluidized bed is increased. When the height of the bed exceeds the level of the lower end of the slit 11, the powder ore 18 is overflown to enter a space between the inner and outer cylinders 6 and 7 at the delivery side. Then, the powder ore 18 is delivered from the delivery port 14 and slides downward in the delivery pipe 16. In this case, since high-temperature air flows inside the blow pipe 4, the slid powder ore 18 is blown into the smelting reduction furnace 1 through the tuyère 3 with the high-temperature air. Note that the high-temperature air flows in the reverse direction inside the delivery pipe 16 and reacts with the powder ore 18 to attach it. However, since the N$_2$ gas is introduced, the powder ore 18 will not be attached to the pipe 16.

Upon feeding of the powder ore 18, the height and width of the opening 17 at the supply side, the volume of the space between the cylinders 6 and 7, the connecting position of the supply pipe 15 to the outer cylinder 6, and the like are appropriately selected, thus realizing a state wherein the powder ore 18 at the supply side is fluidized by the N$_2$ gas flowing into the supply pipe 15 via the opening 17 at the supply side, and only the powder ore 18 overflown from the slit 11 at the delivery side is fed. More specifically, when the N$_2$ gas flow rate is increased, the height of the fluidized bed is increased, and the overflow amount from the slit 11 at the delivery side is increased. In this manner, the feed amount of the powder ore 18 can be controlled, thus realizing a powder feed operation.

FIG. 4 is a graph showing the relationship between an N$_2$ gas flow rate and a powder ore injection rate upon feeding of the chromium powder ore in the above embodiment. A fluidizing N$_2$ gas flow rate (l/min) is plotted along the abscissa, and the powder ore injection rate (kg/min) is plotted along the ordinate. In FIG. 4, marks ○ and ⊖ indicate a case wherein a pressure difference ΔP between the furnaces 1 and 2 is 0.23 kg/cm$^2$, and marks ● and ◉ indicate a case wherein the pressure difference ΔP is 0.43 kg/cm$^2$. The powder ore used in this case has an average particle size of 0.2 mm and a bulk density of 2.5 g/cc, and an angle of repose is 35°. It was confirmed that, after the above-mentioned conditions, e.g., the gap between the cylinders 6 and 7 are appropriately selected, when a gap is formed in the upper portion of each partition plate 10 to form a gas path between the supply and delivery sides, even if the pressure difference between the furnaces 1 and 2 varies within the range of 0.2 to 0.4 kg/cm$^2$, the feed amount of the powder ore 18 will not be changed.

As a matter of course, if the amount of the N$_2$ gas supplied is set below the minimum fluidizing gas flow rate, the powder ore 18 is left in the inner cylinder 7 so as not to be fed therefrom. Therefore, the feed operation of the powder ore 18 can be started and stopped even though no valve is provided to the delivery pipe. A structure and method which can maintain a constant feed amount can be realized regardless of the pressure difference between both the furnaces.

Figure 5:
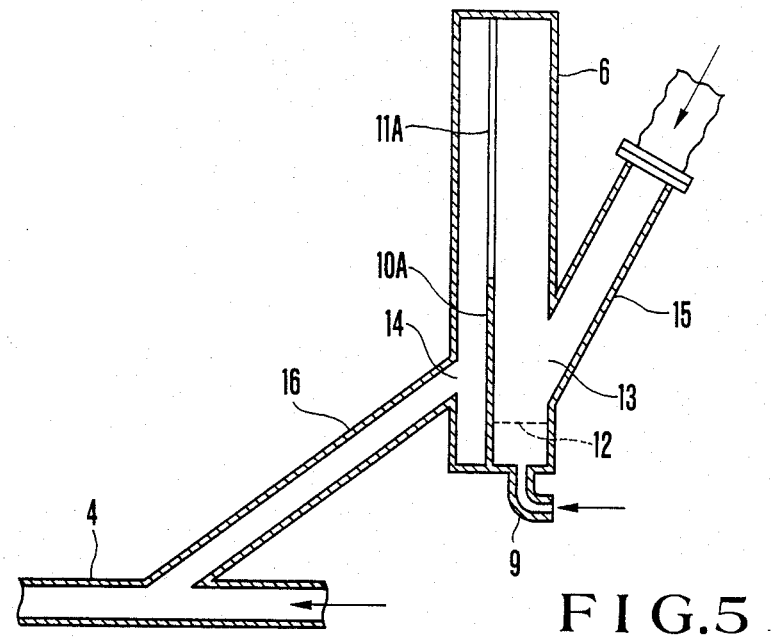
Figure 6:
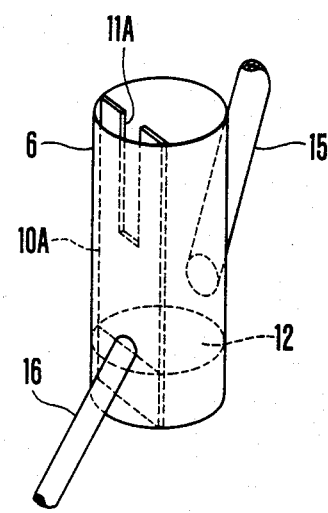

FIGS. 5 and 6 are a cross-sectional view and a perspective view of a powder feeder according to another embodiment of the present invention, in correspondence with FIGS. 2 and 3. In this embodiment, the inner cylinder 7 in the above embodiment is omitted, and only a partition plate 10A is provided. Since other arrangements are the same as those in the above embodiment, the same reference numerals denote the same parts as in the above embodiment and a detailed description thereof will be omitted. More specifically, the partition plate 10A divides the outer cylinder 6 into the supply and delivery sides, and a slit 11A for communicating the supply and delivery sides is formed in an upper half portion of the plate 10A.

With this arrangement, powder ore flowing from the supply pipe 15 into the outer cylinder 6 is overflown by the N$_2$ gas supplied from the gas supply tube 9, thus realizing a powder feed operation as in the above embodiment.

Figure 7:
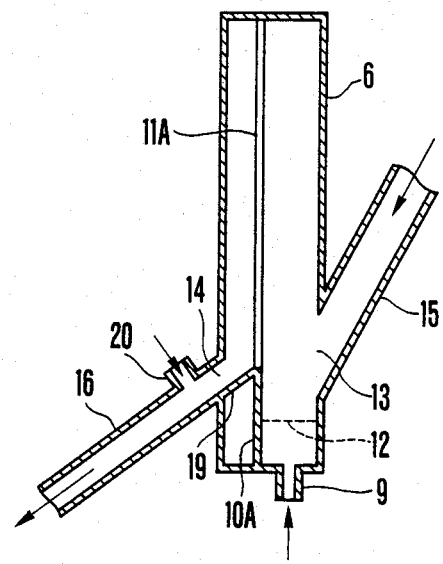
FIG. 7 is a cross-sectional view of a powder feeder according to still another embodiment of the present invention corresponding with FIG. 5.

In the above embodiments, as shown in FIG. 7, if a guide plate 19 for coupling the lower end of the delivery port 14 to the lower edge of the slit 11A to shield the space is provided, the powder ore can be easily guided to the delivery pipe 16.

In the above embodiments, as shown in FIG. 7, if a gas blow hole 20 is arranged midway along the delivery pipe 16 to blow a gas, the powder ore can be smoothly delivered.

In the above embodiments, the case has been exemplified wherein the present invention is applied to a powder ore feeder between the pre-reduction furnace and the smelting reduction furnace. However, the present invention can be applied to any feeders, e.g., a dust delivery unit of an exhaust gas combustor in a rotary kiln process for reduced iron production, or a sand recovery feeder in a molding sand roasting furnace, which feeds a powder by an air or a gas.

Figure 8:
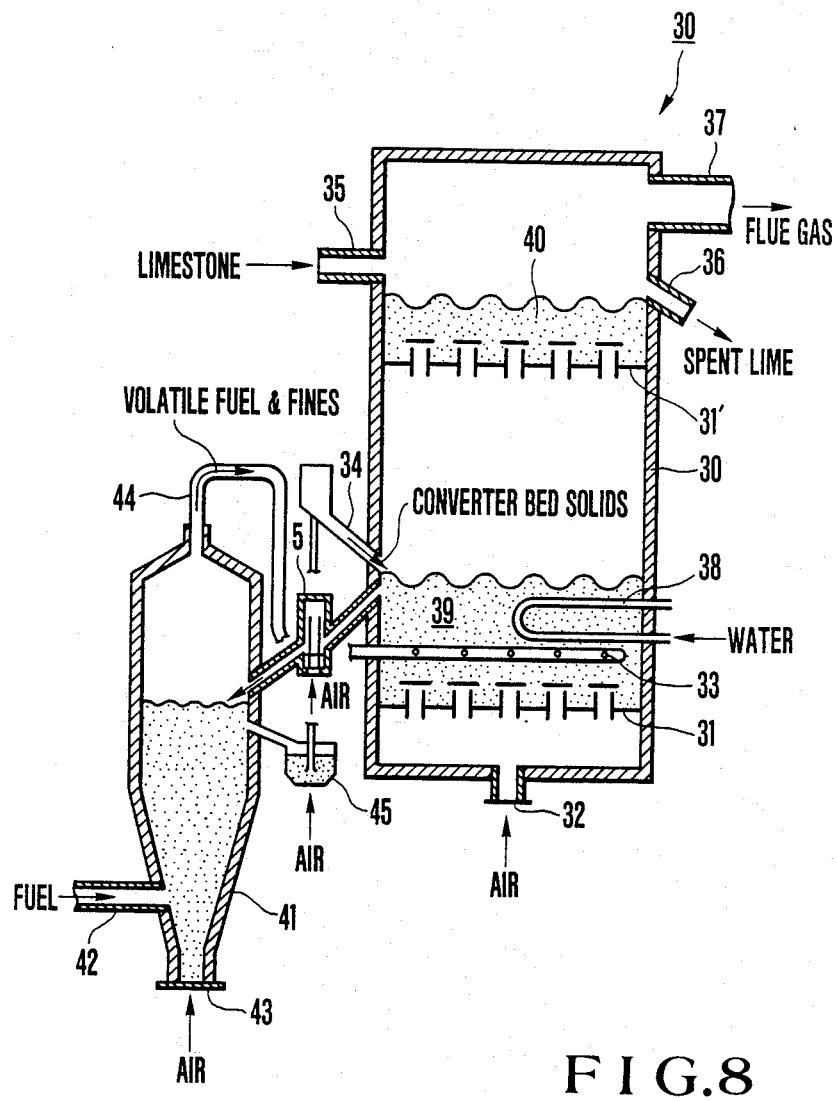
FIG. 8 is a cross-sectional view of a waste combustion fluidized-bed boiler to which the powder feeder of the present invention is applied.

FIG. 8 shows a case wherein the powder feeder of the present invention is applied to a waste combustion fluidized-bed boiler system, and schematically shows the entire system. In FIG. 8, a powder feeder 5 described in detail in the above embodiments is arranged between a fluidized bed combustor 30 and a converter 41. A waste fuel, e.g., garbage, is fed to the lower portion of the converter 41 by a feeder 42. A volatile is gassified by sand at a high temperature (540° C.) fluidized by air supplied from a lower nozzle 43, and is fed into a bed from an exit nozzle 44 through a pipe 33 to be combusted. A solid carbon component is fed into the bed by an air feeder 45 together with the sand from a nozzle 34 to be combusted. The fluidized bed combustor 30 is divided into three chambers by air distributors 31 and 31'. Air enters from a nozzle 32, passes through the distributor 31, causes sand 39 to be fluidized, and causes the volatile and carbon fed from the converter 41 to be combusted. Then, the air passes through the distributor 31' to fluidize limestone 40, causes SO$_x$ in a flue gas to be adsorbed, and is then exhausted from an exit port 37. In this case, the limestone 40 fed onto the distributor 31' can be delivered through a spent line 36. Combustion heat is transmitted to water through a heat transfer pipe 38 to generate steam. Sand at a high temperature (950° C.) is constantly fed to the converter 41 by the powder feeder 5 according to the present invention to keep its temperature. The sand has a particle size of 0.4 to 1.5 mm. Although the pressure in the converter 41 is higher than that in the combustor 30 by 0.05 to 0.1 kg/cm$^2$, since a moving bed is fed to the entrance side pipe of the powder feeder and provides a material seal therefor, the reverse flow of a gas can be prevented and a powder feed operation is allowed at the same time. The operation of the powder feeder is the same as in the above embodiments.

As can be seen from the above description, in a powder feeder of the present invention, supply and delivery pipes are respectively connected to lower portions of a cylinder body, on the supply and delivery sides, which is divided by a partition plate having a communication slit, and a porous plate crossing the lower portion of the cylinder body and a gas blow pipe for fluidizing a powder connected therebelow are provided. With this arrangement, the amount of powder to be fed can be adjusted by simply adjusting a gas flow rate, and a powder can be accurately fed in a constant rate. Therefore, a constant rate of powder can be reliably and easily fed even at a very high temperature without requiring a feed amount adjusting valve, e.g., a rotary valve.

What is claimed is:

1. A powder feeder, comprising:
   a cylinder body connected to a gas blow pipe for fluidizing a powder at its bottom portion;
   a porous plate crossing the lower portion of said cylinder body above a gas blow hole;
   partitioning means for vertically dividing the interior of said cylinder body into a powder supply side and a delivery side and for communicating the supply and delivery sides with each other at its upper portion;
   a powder supply pipe connected to the lower portion of said cylinder body at the supply side to be inclined downward toward a connecting portion; and
   a powder delivery pipe connected to the lower portion of said cylinder body at the delivery side to be inclined downward in a delivery direction.

2. A feeder according to claim 1, wherein said vertical partitioning means comprises an inner cylinder which is concentrically formed in said cylinder body and has a slit for communicating the supply and delivery sides of the interior of said cylinder body with each other, and two partition plates.

3. A feeder according to claim 1, wherein said partitioning means comprises a partition plate having a slit for communicating the supply and delivery sides of the interior of said cylinder body with each other.

4. A feeder according to claim 2, further comprising a guide plate for coupling a lower end of the lower portion of said cylinder body at the delivery side and a lower edge of said slit.

5. A feeder according to claim 4, wherein a gas blow hole is formed in said powder delivery pipe.

6. A feeder according to claim 3, further comprising a guide plate for coupling a lower end of the lower portion of said cylinder body at the delivery side and a lower edge of said slit.

7. A feeder according to claim 6, wherein a gas blow hole is formed in said powder delivery pipe.

8. A waste combustion system comprising a converter for combusting a waste to generate a converter gas; a fluidized bed combustor for combusting the converter gas to recover heat; and a powder feeder, said powder feeder comprising: a cylinder body connected to a gas blow pipe for fluidizing a powder at its bottom portion; a porous plate crossing the lower portion of said cylinder body above a gas blow hole; partitioning means for vertically dividing the interior of said cylinder body into a powder supply side and a delivery side and for communicating the supply and delivery sides with each other at its upper portion; a powder supply pipe connected to the lower portion of said cylinder body at the supply side to be inclined downward toward a connecting portion; and a powder delivery pipe connected to the lower portion of said cylinder body at the delivery side to be inclined downward in a delivery direction.

* * * * *